(12) United States Patent
Ohsawa

(10) Patent No.: US 7,434,560 B2
(45) Date of Patent: Oct. 14, 2008

(54) BALANCING DEVICE FOR AN ENGINE

(75) Inventor: Hiroshi Ohsawa, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 11/837,148

(22) Filed: Aug. 10, 2007

(65) Prior Publication Data

US 2008/0035095 A1 Feb. 14, 2008

(30) Foreign Application Priority Data

Aug. 11, 2006 (JP) ............................. 2006-219811

(51) Int. Cl.
F02B 75/06 (2006.01)
(52) U.S. Cl. ..................................... 123/192.2; 74/603
(58) Field of Classification Search .............. 123/192.2; 74/603
See application file for complete search history.

(56) References Cited

U.S. PATENT DOCUMENTS 6,880,512 B2 * 4/2005 Hashimoto et al. ....... 123/192.2

FOREIGN PATENT DOCUMENTS

JP 57-044863 3/1982
JP 05-172187 7/1993

* cited by examiner

Primary Examiner—Noah Kamen
(74) Attorney, Agent, or Firm—Hirsch Simpson LLC

(57) ABSTRACT

With a view to reducing the load imposed by a cantilevered balancer weight on a balancer shaft bearing while balancing the inertia force generated by the balancer weights with the center of gravity of a piston and connecting road system, a balancing device for an engine is provided, the device having a second balancer weight which is cantilevered at a position opposing a first balancer weight, wherein the balancer shaft bearing between the first and the second balancer weights is displaced toward the second balancer weight according to the axial direction of the balancer shaft for a certain distance from an intersection Y of the axis of the balancer shaft with a plane passing through the center of gravity Gp of the piston-connecting rod system so that the distance L2 between the intersection Y and the center of gravity G2 of the second balancer weight is longer than the distance L1 between the intersection Y and the center of gravity G1 of the first balancer weight and so that the moment created at the intersection Y by the inertia force F1 of the first balancer weight and the moment created at the intersection Y by the inertia force F2 of the second balancer weight are balanced.

4 Claims, 4 Drawing Sheets

Gp, G1, G2 : CENTER OF GRAVITY

BALANCING DEVICE FOR AN ENGINE

FIELD OF THE INVENTION

The present invention relates to balancing devices for engines, and more particularly to balancing devices where the balancer weight is formed of two parts, the first part being formed of a first balancer weight disposed between two balancer shaft bearings, and the second part being formed of a second balancer weight either cantilevered or projecting at a position opposing the first balancer weight, a balancer shaft bearing being positioned between the first and the second parts of the balancer weights.

BACKGROUND OF THE INVENTION

In engines such as four-cycle four-cylinder engine, a secondary inertia force is produced at the center of gravity of the piston-connecting rod system.

Taking this into account, some engines are equipped with a balancing device where the balancer shaft is rotated twice as fast as the revolution speed of the engine to compensate the secondary inertia force.

Also, the balancing device is sometime disposed directly under a crank case taking into consideration the assembly or the lubrication system.

Further, it is known that, for downsizing the balancing device, the balancer weight can be formed of two parts, the first part being formed of a first balancer weight disposed between two balancer shaft bearings; and the second part being formed of a second balancer weight cantilevered or projecting at a position opposing the first balancer weight, a balancer shaft bearing being positioned between the first and the second balancer weights.

PRIOR ART

The following documents 1 and 2 form the prior art of the present patent application:
   Document 1: Japanese Patent Application Published under No. S57-44863
   Document 2: Japanese Patent Application Laid-Open Publication published under No. H05-172187

DISCLOSURE OF THE INVENTION

Problems to be Solved by the Invention

In conventional balancing devices such as shown in FIG. 6, a balancer shaft 119 includes, at one end (left side on FIG. 6), a large diameter element 126 for connecting to an oil pump, and, toward the other end with respect to this large diameter element 126, second shaft elements 128, 131 for the balancer shaft bearings.

This balancer weight is formed of two parts. The first part, consisting in the balancer weight 133, is disposed between the two balancer shaft bearings, i.e. first and second shaft sections 128 and 131. The second part consisting in the balancer weight 134 is disposed at a position opposing the first balancer weight 133, the other balancer shaft bearing, i.e. the second shaft section 131, being positioned between these balancer weights 133 and 134.

Until now, when the balancer weight is formed of two parts, the first and the second balancer weights 133 and 134 are identical.

The second balancer weight 134 is cantilevered when the balancer shaft 119 is assembled.

In this conventional balancer shaft 119, distance L1' and distance L2' are identical. The distance L1' is the length between an intersection Y' and the center of gravity G1 of the first balancer weight 133, which intersection Y' is at a junction of a plane X' (that passes through the center of gravity of the piston-connecting rod system) and a shaft axis C' of the balancer shaft 119. The distance L2' corresponds to the length between the intersection Y' and the center of gravity G2' of the second balancer weight 134.

This configuration allows to balance or compensate moment F1'XL1' and moment F2'XL2'. Moment F1'XL1' is the moment created at the intersection Y' by the inertia force F1' of the first balancer weight 133. Moment F2'XL2' is the moment created at the intersection Y' by the inertia force F2' of the second balancer weight 134.

However, a balancing device having such a configuration is disadvantageous in that the cantilevered second balancer weight imposes a load on the balancer shaft bearing, thereby degrading the durability of the balancer shaft bearing.

Also, since an exhaust pipe is often disposed under the oil pan in a front wheel drive vehicle, this position of the exhaust pipe creates difficulties for the positioning of the second balancer weight.

A first object of the present invention is to provide a balancing device in which
   a balancer shaft is rotatably supported, under a crankshaft, by balancer shaft bearings,
   a first balancer weight is disposed between the balancer shaft bearings,
   and a second balancer weight is cantilevered at a position opposing the first balancer weight, the other balancer shaft bearing being disposed between the first and the second balancer weights, wherein the balancing device reduces the load imposed by the cantilevered second balancer weight on the balancer shaft bearing and balances or compensates the inertia force generated by the balancer weights with the center of gravity of the piston and connecting rod systems.

A second object of the present invention is to provide a space for arranging the parts adjacent the balancer weight, which is achieved by effectively mounting the balancer weight.

Means to Solve the Problems

In order to obviate the above-mentioned disadvantages, the present invention provides a balancing device for an engine, comprising
   a crankshaft rotatably supported in a crank case,
   two balancer shafts disposed below the crankshaft, the axes thereof being parallel to the crankshaft, these balancer shafts being rotatably supported by at least two balancer shaft bearings and being disposed according to the axial direction of the balancer shaft,
   a first balancer weight disposed on the balancer shaft between the balancer shaft bearings,
   a second balancer weight cantilevered at a position opposing the first balancer weight, the other balancer shaft bearing being positioned between the balancer weights, the balancing device permitting the inertia forces generated by the first and the second balancer weights to be applied to the center of gravity of the piston-connecting rod system for compensating the secondary inertia force generated by the engine.

In such a balancing device, the balancer shaft bearing between the first and the second balancer weights is displaced or offset toward the second balancer weight, according to the axial direction of the balancer shaft, for a defined distance from the intersection Y of the axis of the balancer shaft with a plane passing through the center of gravity Gp of the piston-connecting rod system so that distance L2 between the intersection Y and the center of gravity G2 of the second balancer weight is longer than the distance L1 between the intersection Y and the center of gravity G1 of the first balancer weight and so that the moment created at the intersection Y by the inertia force F1 of the first balancer weight and the moment created at the intersection Y by the inertia force F2 of the second balancer weight are balanced or compensated.

Effects of the Invention

As thus described, according to the present invention, the crankshaft is rotatably supported in a crank case, the two balancer shafts are disposed below the crankshaft and have the axes thereof extending in a direction parallel with the crankshaft, these balancer shafts being rotatably supported by at least two balancer shaft bearings and being disposed according to the axial direction of the balancer shaft, the first balancer weight is disposed on the balancer shaft between the balancer shaft bearings, the second balancer weight is cantilevered at the position opposing the first balancer weight, the other balancer shaft bearing being positioned between the balancer weights, and the balancing device permits the inertia forces generated by the first and the second balancer weights to be applied to the center of gravity of the piston-connecting rod system for compensating the secondary inertia force generated by the engine.

In such a balancing device, the balancer shaft bearing situated between the first and the second balancer weights is displaced toward the second balancer weight along an axial direction of the balancer shaft by a defined distance with respect to the intersection Y of the axis of the balancer shaft with the plane passing through the center of gravity Gp of the piston-connecting rod system so that the distance L2 between the intersection Y and the center of gravity G2 of the second balancer weight is longer than the distance L1 between the intersection Y and the center of gravity G1 of the first balancer weight and so that the moment created at the intersection Y by the inertia force F1 of the first balancer weight and the moment created at the intersection Y by the inertia force F2 of the second balancer weight are balanced.

Accordingly, the inertia force created by the first and the second balancer weights are applied to the center of gravity Gp of the piston-connecting rod system to effectively compensate the inertia force due to the engine.

Also, the second balancer weight can be made lighter than the conventional systems in which the balancer shaft bearing between the first and the second balancer weights is positioned at the intersection of the axis of the balancer shaft with the plane passing through the center of gravity of the piston-connecting rod system.

This improves the durability of the balancer shaft bearing by reducing the load that the cantilevered second balancer weight imposes thereon.

BEST MODE FOR CARRYING OUT THE INVENTION

According to the configuration resulting from the present invention, the balancer shaft bearing between the first and the second balancer weights is displaced toward the second balancer weight along the axial direction of the balancer shaft for a certain distance from the intersection Y of the axis of the balancer shaft with the plane passing through the center of gravity Gp of the piston-connecting rod system so that the distance L2 between the intersection Y and the center of gravity G2 of the second balancer weight is longer than the distance L1 between the intersection Y and the center of gravity G1 of the first balancer weight and so that the moment created at the intersection Y by the inertia force F1 of the first balancer weight and the moment created at the intersection Y by the inertia force F2 of the second balancer weight are balanced. Accordingly, the inertia force produced by the first and the second balancer weights is applied to the center of gravity Gp of the piston-connecting rod system to effectively compensate the inertia force due to the engine.

Also, with respect to the conventional system the second balancer weight can be made lighter, due to the fact that the balancer shaft bearing between the first and the second balancer weights is positioned at the intersection of the axis of the balancer shaft with the plane passing through the center of gravity of the piston-connecting rod system.

This improves the durability of the balancer shaft bearing by reducing the load that the cantilevered second balancer weight imposes thereon.

DETAILED DESCRIPTION OF A PREFERRED EMBODIMENT OF THE INVENTION

An embodiment of the present invention is explained in detail as follows with reference to the appended Figures.

Figure 1:
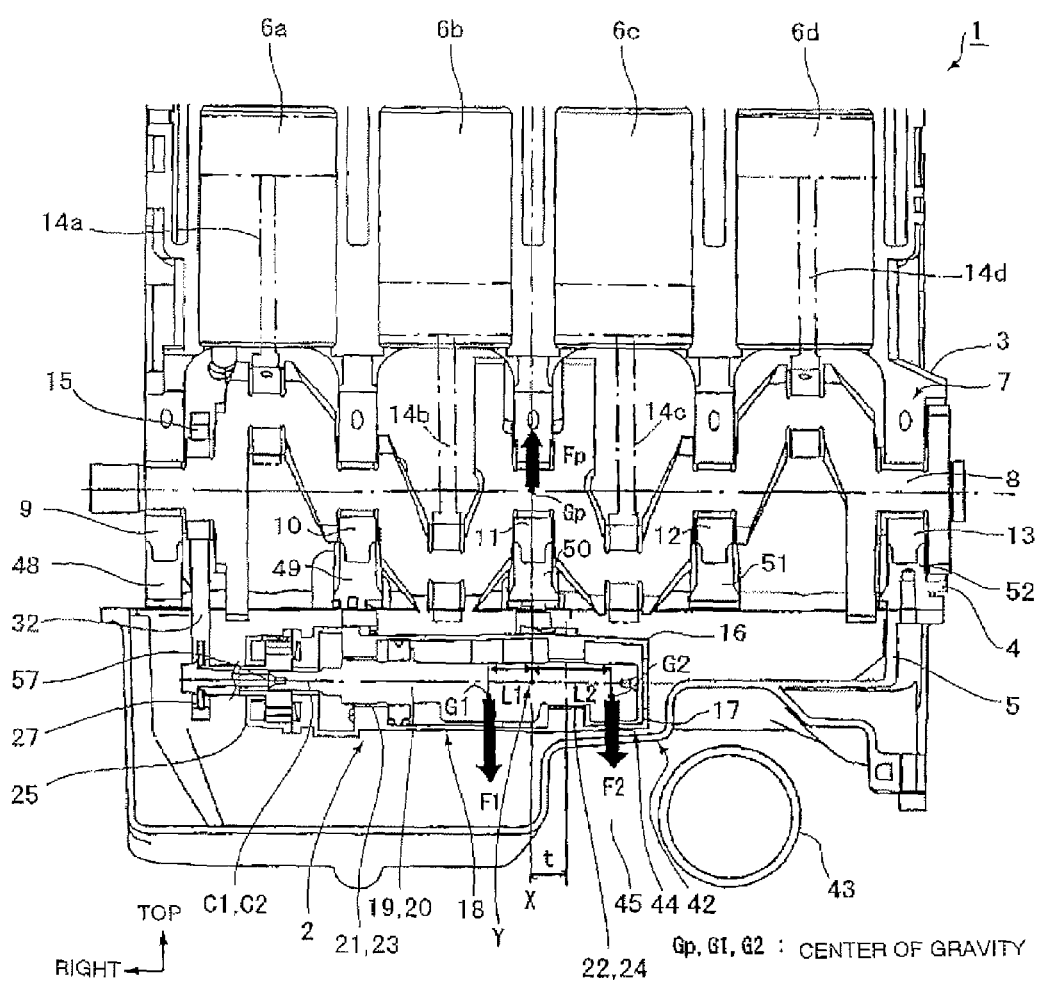
FIG. 1 is a schematic cross-sectional view of an engine according to an embodiment of the present invention.
Figure 2:
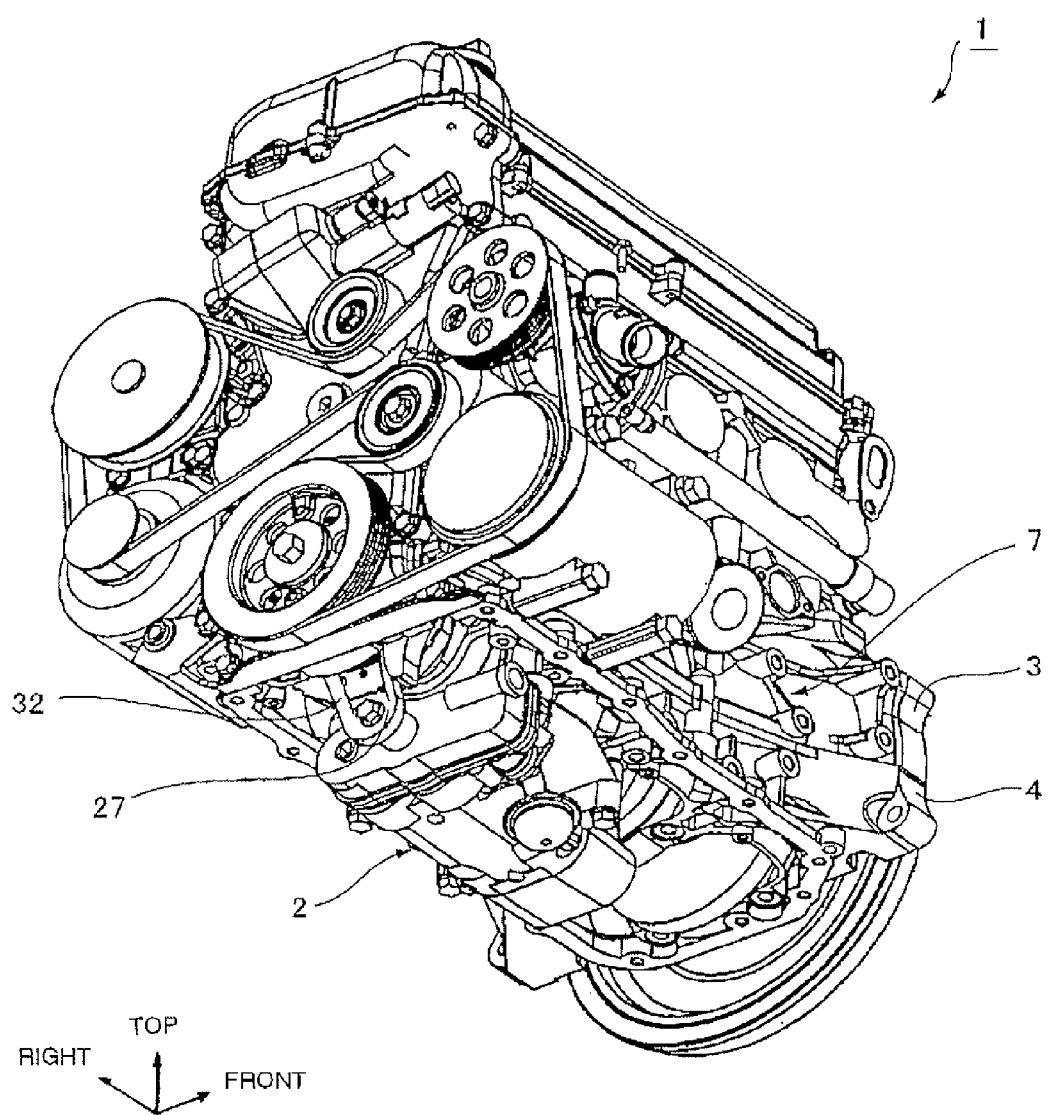
FIG. 2 is a perspective view of the engine with a balancing device, viewed diagonally from below.

FIG. 1 shows a four-cylinder engine (hereinafter referred to as "engine") 1 and a balancing device 2 of the engine 1.

Referring to FIG. 1, the engine 1 is provided with a cylinder block 3, a cylinder lower case 4 adapted to a lower surface of the cylinder block 3, and an oil pan 5 adapted to the lower surface of the cylinder lower case 4.

The cylinder block 3 includes four pistons, i.e. first to fourth pistons 6a, 6b, 6c, 6d.

The cylinder block 3 and the cylinder block lower case 4 form the crank case 7. Within the crank case 7, a crankshaft 8 is disposed between the cylinder block 3 and the cylinder block lower case 4.

On FIG. 1, the crankshaft 8 is rotatably supported by five crankshaft bearings, i.e. first to fifth crankshaft bearings 9, 10, 11, 12, 13, each of them being disposed successively, along the axial direction of the crankshaft 8, respectively between, two of the first to fourth pistons 6a, 6b, 6c, 6d.

The crankshaft 8 is connected to the first to fourth pistons 6a, 6b, 6c, 6d through first to fourth connecting rods 14a, 14b, 14c, 14d respectively.

Also at one end of the crankshaft 8, a crank sprocket 15 is attached on the inner face of a first crankshaft bearing 9 for supporting the crankshaft 8.

The crank sprocket 15 functions to transmit the torque produced by the crankshaft 8 to the balancing device 2.

The balancing device 2 is arranged below the cylinder block lower case 4 and within the oil pan 5.

The balancing device 2 includes, as shown in FIGS. 1-4, a balancer case 18 formed by upper and lower balancer cases 16, 17, and two balancer shafts, i.e. a first balancer shaft 19 on a first side and a second balancer shaft 20 on a second side, which are contained in the balancer case 18.

Figure 4:
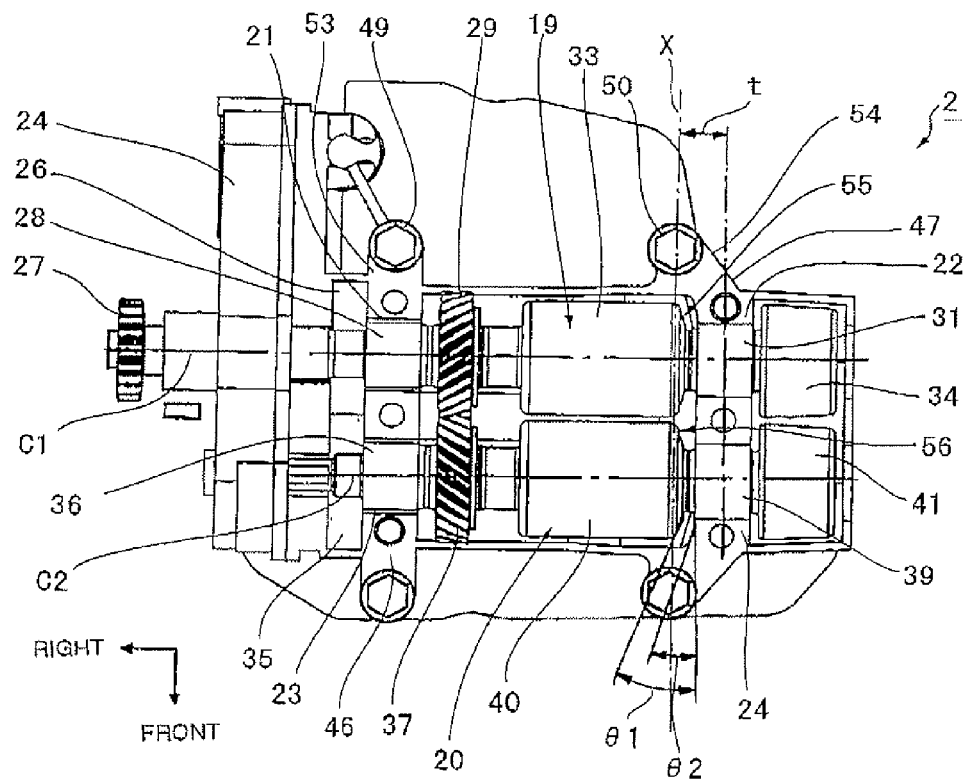
FIG. 4 is a bottom view of the balancing device without a balancer case.

Referring to FIG. 4, the first and the second balancer shafts 19, 20 are disposed below the crankshaft 8 so that their axes C1, C2 are parallel with the crankshaft 8.

Incidentally, the first and the second balancer shafts 19, 20 are disposed so that to be parallel with the line of junction of the cylinder block lower case 4 and the oil pan 5, as shown in FIGS. 1-4.

Figure 3:
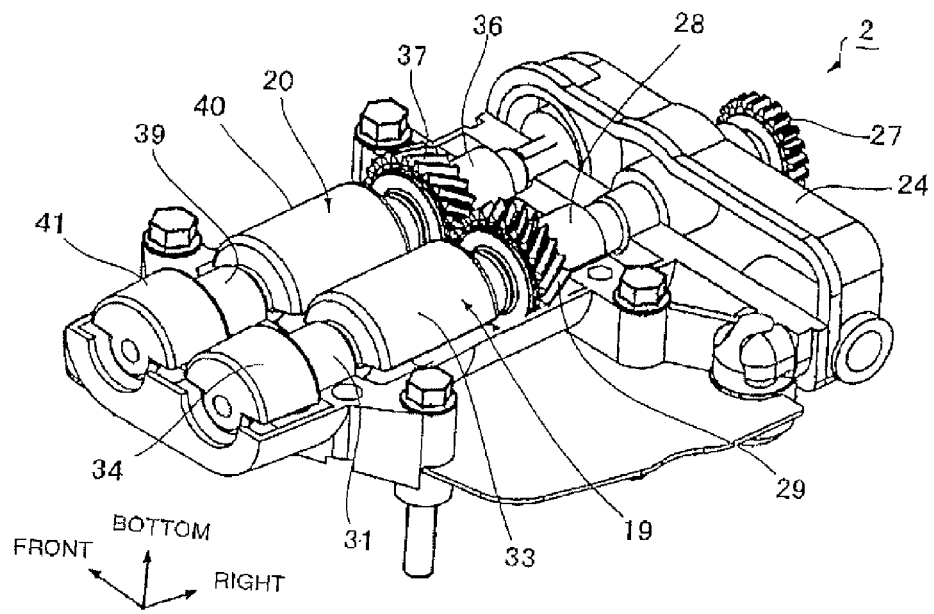
FIG. 3 is a perspective view of the balancing device disposed upside down, viewed from behind.

Referring now to FIGS. 1, 3, and 4, the first balancer shaft 19 is, on the same side, rotatably supported by, for example, two balancer shaft bearings, i.e. first and second balancer shaft bearings 21, 22, which are disposed on the same side along the direction of the axis C1. The second balancer shaft 20 is, on the other side, rotatably supported by for example two balancer shaft bearings, i.e. first and second balancer shaft bearings 23, 24 which are disposed on the same other second side, along the direction of the axis C2.

Figure 5:
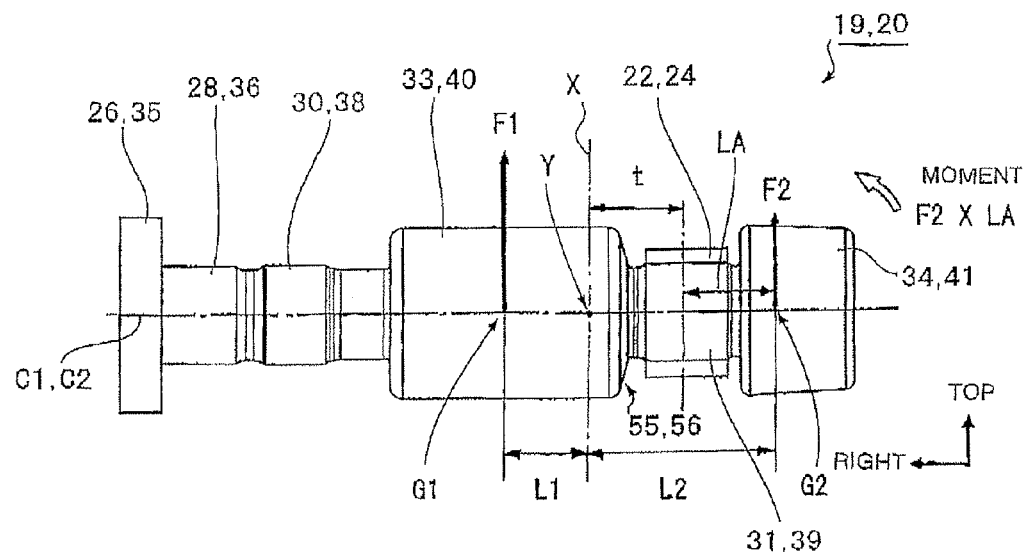
FIG. 5 is an enlarged schematic representation of a balancer shaft.

Referring to FIGS. 3-5, the first balancer shaft 19, on the one hand, has at one extremity (left side in FIGS. 4-5) a large diameter element 26 on a first side for connecting an oil pump 25. At this extremity of the large diameter element 26, a balancer sprocket 27 is attached. Toward the other end of the first balancer shaft 19 (right side in FIGS. 4-5) with respect to the large diameter element 26, are present on the first side a first shaft section 28 for the first balancer shaft bearing 21, a first balancer gear mounting section 30 for attaching the first balancer gear 29, and a second shaft section 31 for the second balancer shaft bearing 22.

The first balancer gear 29 on the first side is a helically-shaped gear.

Under these circumstances, the balancer sprocket 27 with the crank sprocket 15 of the crankshaft 8 cooperates with the balancer sprocket 27 of the balancing device 2 through a balancer chain 32 transmitting consequently the torque of the crankshaft 8 through the crank sprocket 15 and the balancer chain 32.

Then the first balancer shaft 19 on the first side includes a first balancer weight 33 on the first side between the first and the second balancer shaft bearings 21, 22, that is between the first balancer gear mounting section 30 and the second shaft section 31. The first balancer shaft 19 also includes a second balancer weight 34 cantilevered or projecting at a position opposing the first balancer weight 33 with the other balancer shaft bearing, i.e. the second shaft section 31 intervening.

Similarly to the first balancer shaft 19 on the first side, as shown in FIGS. 3-5, the second balancer shaft 20 of the second side has at one extremity (left side in FIGS. 4-5) a large diameter element 35 on the second side for connecting an oil pump 25. Toward the other end of the second balancer shaft 20 (right side in FIGS. 4-5) with respect to the large diameter element 35 on the second side, there are provided, on the second side, a first shaft section 36 for the first balancer shaft bearing 23, a second balancer gear mounting section 38 for attaching a second balancer gear 37, and a second shaft section 39 for the second balancer shaft bearing 24.

The second balancer gear 37 on the second side is formed in the symmetrical helical gear shape so as to mesh with the first balancer gear 29 on the first side. The second balancer gear 37 permits smooth rotational motion and the transmission of a higher torque by increased rate of meshing as compared to spur gears while reducing vibration and noise.

The second balancer shaft 20 on a second side includes the first balancer weight 40 between the first and the second balancer shaft bearings 23, 24, that is between the second balancer gear mounting section 38 and the second shaft section 39. The second balancer shaft 20 also includes a second balancer weight 41 cantilevered at a position opposing the first balancer weight 40 with the other balancer shaft bearing, i.e. the second shaft section 39 intervening.

Here, as shown in FIGS. 3-4, the first balancer gear 29 of the first balancer shaft 19 on the first side and the second balancer gear 37 of the second balancer shaft 20 on the second side mesh to transmit the torque from the first balancer shaft 19 to the second balancer shaft 20.

The first and the second balancer shafts 19, 20 rotate twice as fast as the revolution speed of the engine 1, and applies the inertia forces F1, F2 generated by the first and the second balancer weights 33, 34, 40, 41 to the center of gravity Gp of the piston-connecting rod system to compensate the secondary inertia force Fp generated by the engine 1.

Further, the second balancer shaft bearings 22, 24, which are disposed between the first balancer weights 33, 40 and the second balancer weights 34, 41 on the first and the second sides respectively, are displaced toward the second balancer weights 34, 41 for a certain distance t in a direction of axes C1, C2 of the first and the second balancer shafts 19, 20 from an intersection Y which is at the junction of the axes C1, C2 and a plane X that passes through the center of gravity Gp of the piston-connecting rod system.

In addition, the distance L2 between the intersection Y and the center of gravity G2 of the second balancer weights 34, 41 is set longer than the distance L1 between the intersection Y and the center of gravity G1 of the first balancer weights 33, 40. The moment created at the intersection Y by the inertia force F1 of the first balancer weights 33, 40 and the moment created at the intersection Y by the inertia force F2 of the second balancer weights 34, 41 are set to be balanced.

Figure 6:
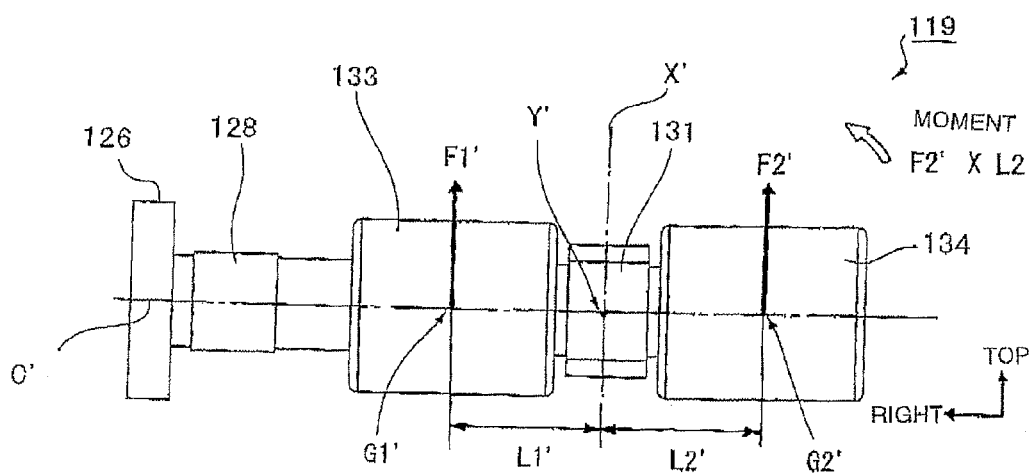
FIG. 6 is an enlarged schematic representation of a conventional balancer shaft.

More particularly, in arranging the second balancer shaft bearings 22, 24 on the first and the second sides, as is clear from FIG. 5 and FIG. 6 that shows prior art, the plane X passes through the center of gravity Gp of the piston-connecting rod system and intersects the axes C1, C2 of the first and the second balancer shafts 19, 20. The second balancer shaft bearings 22, 24 on the first and the second sides are disposed at a position offset for the certain distance t from the intersection Y with the plane X toward the second balancer weights 34, 41, i.e. toward the right side in FIG. 5.

Here, the distance between a point offset by a distance t from the intersection Y and the center of gravity G2 of the second balancer weights 34, 41 is designated as a length LA.

The distance L2 between the intersection Y and the center of gravity G2 of the second balancer weights 34, 41 is longer than the distance L1 between the intersection Y and the center of gravity G1 of the first balancer weights 33, 40 so as to balance the moment F1XL1 created at the intersection Y by the inertia force F1 of the first balancer weights 33, 40 and the moment F2XL2 created at the intersection Y by the inertia force F2 of the second balancer weights 34, 41 (i.e. F1XL1=F2XL2).

Thereby, the inertia forces F1, F2 generated by the first and the second balancer weights 33, 34, 40, 41 are applied to the center of gravity Gp of the piston-connecting rod system to effectively compensate the secondary inertia force Fp generated by the engine 1.

Also, the second balancer weights 34, 41 can be made lighter than the conventional system disclosed in FIG. 6. This improves the durability of the second balancer shaft bearings 22, 24 by reducing the load imposing by the cantilevered second balancer shaft bearings 22, 24.

In addition, the second balancer weights 34, 41 on the first and the second sides are formed to have diameters centered on the axes C1, C2 of the first and the second balancer shafts 19, 20 and which are gradually reduced toward the extremities or ends of the first and the second balancer shafts 19, 20.

More particularly, as shown in FIG. 5, the second balancer weights 34, 41 are tapered; the outside dimension or the diameter of the second balancer weights 34, 41, the axes C1, C2 of which being centered, gradually become smaller in size from the one end (left side in FIG. 5) to the other end (right side in FIG. 5).

Accordingly, the center of gravity G2 of the second balancer weights 34, 41 can be closer to the second balancer shaft bearings 22, 24, which reduces the load on the second balancer shaft bearings 22, 24 and therefore contributes to the durability of the second balancer shaft bearings 22, 24.

Further, the balancing device 2 is disposed below the lower surface of the cylinder block lower case 4 and within the oil pan 5, so that the second balancer weights 34, 41 can be positioned within the oil pan 5 adapted to the lower part of the crank case 7. As shown FIG. 1, the lower surface of the oil pan 5 presents an inclined surface 42 close to surfaces of the second balancer weights 34, 41; an exhaust pipe 43 is further disposed below the inclined surface 42.

An inclined surface 44 on a case side is also formed in the lower balancer case 17 of the balancer case 18 for the balancing device 2 so as to correspond to the shape of the tapered second balancer weights 34, 41. The inclined surface 42 is formed in the oil pan 5 at a position opposing the inclined surface 44 on the case side.

Thereby, the oil pan 5 covering the lower part of the second balancer weights 34, 41 can be downsized so as to produce a space 45 below the oil pan 5 for arranging the exhaust pipe 43 which may have a larger cross-section.

Moreover, the first and the second balancer shafts 19, are contained in the balancer case 18 formed by the upper and lower balancer cases 16, 17.

Then the balancer case 18 is provided with a first balancer shaft bearing holding section 46 toward the one end with respect to the first balancer weights 33, 40 for holding the first balancer shaft bearings 21, 23, and with a second balancer shaft bearing holding section 47 between the first balancer weights 33, 40 and the second balancer weights 34, 41 for holding the second balancer shaft bearings 22, 24.

Also referring to FIG. 1, the lower part of the cylinder lower case 4 includes first to fifth crankshaft bearing holding sections 48, 49, 50, 51, 52 to correspond to the first to fifth crankshaft bearings 9, 10, 11, 12, 13.

The balancer case 18 is provided with a first mounting bracket 53 for connecting the first balancer shaft bearing holding section 46 and the second crankshaft bearing holding section 49, and with a second mounting bracket 54 for connecting the second balancer shaft bearing holding section 47 and a third crankshaft bearing holding section 50 that is adjacent to the center of gravity Gp of the piston-connecting rod system.

The end surfaces of the first balancer weights 33, 40 facing the second balancer weights 34, 41 are formed so that they present inclined surfaces 55, 56 on both first and second sides which are inclined toward the outer diameter away from the ends of the second balancer weights 34, 41. The second mounting bracket 54 presents an inclination in the proximity of the inclined surfaces 55, 56 to be in a shape so that the second mounting bracket 54 connects in line the second balancer shaft bearing holding section 47 with the third crankshaft bearing holding section 50.

More particularly, the inclined surfaces 55, 56 on the first and the second sides are tapered so that to form an angle θ1 departing from the ends of the second balancer weights 34, 41, as shown in FIG. 4.

Also the second mounting bracket 54 is inclined at an angle θ2 corresponding to the angle made by the inclined surfaces 55, 56.

In other words, in the embodiment of the present invention, the second balancer shaft bearings 22, 24 between the first balancer weights 33, 40 and the second balancer weights 34, 41 of the first and the second sides, are displaced or offset for a certain distance t toward the second balancer weights 34, 41. The second mounting bracket 54 is therefore increased in length, so that the inertia forces of the first balancer weights 33, 40 and the second balancer weights 34, 41 is not effectively transmitted to the center of gravity of the piston-crank system. However, the second mounting bracket 54 is inclined in correspondence with the inclined surfaces 55, 56. Owing to the second mounting bracket 54, the portion between the second balancer shaft bearing holding section 47 and the third crankshaft bearing holding section 50 can present a shape able to connect according to a straight line.

Accordingly, the inertia forces generated by the first balancer weights 33, 40 and the second balancer weights 34, 41 can effectively be transmitted to the third crankshaft bearing holding section 50 disposed below the center of gravity Gp of the piston-connecting rod system.

Reference numeral 57 designates a mounting bolt for attaching the balancer sprocket 27 to the one end of the first balancer shaft 19.

Next, the operation of the present invention is explained as follows.

When the engine 1 is driven to rotate the crankshaft 8, the crank sprocket 15 at one end of the crankshaft 8 transmits the torque to the first balancer shaft 19 on the first side of the balancing device 2 through the balancer chain 32 and the balancer sprocket 27.

Then the torque transmitted to the first balancer shaft 19 on the first side is transmitted to the second balancer shaft 19 on the second side through the first balancer gear 29 and the second balancer gear 37 so that to cooperate efficiently with the first balancer gear 29.

At this moment, the first and the second balancer shafts 19, 20 rotate twice as quickly as the revolution speed of the engine 1 in order to apply the inertia forces F1, F2 generated by the first and the second balancer weights 33, 34, 40, 41 to the center of gravity Gp of the piston-connecting rod system so as to compensate the secondary inertia force Fp generated by the engine 1.

Thereby, in the balancing device 2 of the engine 1, the second balancer shaft bearings 22, 24, which are disposed between the first balancer weights 33, 40 and the second balancer weights 34, 41, are displaced of the defined distance t in the direction of axes C1, C2 of the first and the second balancer shafts 19, 20 toward the second balancer weights 34, 41 from an intersection Y which is at the junction of the axes C1, C2 and the plane X passing through the center of gravity Gp of the piston-connecting rod system so that the distance L2 between the intersection Y and the center of gravity G2 of the second balancer weights 34, 41 is longer than the distance L1 between the intersection Y and the center of gravity G1 of the first balancer weights 33, 40 and so that the moment created at the intersection Y by the inertia force F1 of the first balancer weights 33, 40 and the moment created at the intersection Y by the inertia force F2 of the second balancer weights 34, 41 are balanced.

Consequently, the inertia forces F1, F2 by the first balancer weights 33, 40 and the second balancer weights 34, 41 are applied to the center of gravity Gp of the piston-connecting rod system to compensate the inertia force by the engine.

Also, the second balancer weight can be made lighter than the conventional system in which the balancer shaft bearing between the first and the second balancer weights is positioned at the intersection of the axis of the balancer shaft with the plane passing through the center of gravity of the piston-connecting rod system.

This improves the durability of the balancer shaft bearing by reducing the load that the cantilevered second balancer weight imposes thereon.

The second balancer weights 34, 41 are tapered; the outside dimension or the diameter of the second balancer weights 34, 41 having the axes C1, C2 at the center, gradually become smaller in size from the one end to the other end of the balancer shafts 19, 20.

Consequently, the center of gravity G2 of the second balancer weights 34, 41 can be closer to the second balancer shaft bearings 22, 24, which reduces the load on the second balancer shaft bearings 22, 24 and therefore contributes to the durability of the second balancer shaft bearings 22, 24.

Further, the balancer weights 34, 41 are disposed within the oil pan 5 that is adapted to the lower part of the crank case 7, and the oil pan 5 presents a lower surface formed with the inclined surface 42 along surfaces of the second balancer weights 34, 41; an exhaust pipe 43 is further arranged below the inclined surface 42.

Consequently, the oil pan 5 covering the lower part of the second balancer weights 34, 41 can be downsized so as to produce the space 45 below the oil pan 5 for arranging the exhaust pipe 43 having the larger cross-section.

Still further, the balancer shafts 19, 20 are contained in the balancer case 18, and the balancer case 18 is provided with the second mounting bracket 54 for connecting the second balancer shaft bearing holding section 47, which is between the first and the second balancer weights 33, 40, 34, 41, and for example the third crankshaft bearing holding section 50 adjacent the center of gravity Gp of the piston-connecting rod system. Then the end surfaces of the first balancer weights 33, 40 facing the second balancer weights 34, 41 are formed to have the inclined surfaces 55, 56 of first and second sides which are inclined toward the outer diameter away from the ends of the second balancer weights 34, 41. The second mounting bracket 54 is inclined along the inclined surfaces 55, 56 to be in a shape so that the second mounting bracket 54 connects in line the second balancer shaft bearing holding section 47 with the third crankshaft bearing holding section 50.

Consequently, the inertia forces generated by the first balancer weights 33, 40 and the second balancer weights 34, 41 can effectively be transmitted to the third crankshaft bearing holding section 50 disposed below the center of gravity Gp of the piston-connecting rod system.

EXPLANATION OF REFERENCE NUMERALS

1: —four-cylinder engine (simply referred to as engine);
2: —balancing device;
3: —cylinder block;
4: —cylinder block lower case;
5: —oil pan;
6, 6b, 6c, 6d: —first to fourth pistons;
7: —crank case;
8: —crankshaft;
9, 10, 11, 12, 13: —first to fifth crankshaft bearings;
14a, 14b, 14c, 14d: —first to fourth connecting rods;
15: —crank sprocket;
16: —upper balancer case;
17: —lower balancer case;
18: —balancer case;
19: —first balancer shaft on a first side;
20: —second balancer shaft on a second side;
21, 22: —first and second balancer shaft bearings on the first side;
23, 24: —first and second balancer shaft bearings on the second side;
25: —oil pump
26: —large diameter section on the first side;
27: —balancer sprocket;
28: —first shaft section on the first side;
29: —first balancer gear on the first side;
30: —first balancer gear mounting section on the first side;
31: —second shaft section on the first side;
32: —balancer chain;
33: —first balancer weight on the first side;
34: —second balancer weight on the first side;
35: —large diameter section on the second side;
36: —first shaft section on the second side;
37: —second balancer gear on the second side;
38: —second balancer gear mounting section on the second side;
39: —second shaft section on the second side;
40: —first balancer weight on the second side;
41: —second balancer weight on the second side;
42: —inclined surface;
34: —exhaust pipe;
44: —inclined surface on a case side;
45: —space;
46: —first balancer shaft bearing holding section;
47: —second balancer shaft bearing holding section;
48, 49, 50, 51, 52: —first to fifth crankshaft bearing holding section;
53: —first mounting bracket;
54: —second mounting bracket;
55, 56: —inclined surfaces on the first and the second sides; and
57: —mounting bolt.

What is claimed is:

1. A balancing device for an engine, having
a crankshaft rotatably supported in a crank case,
two balancer shafts disposed below the crankshaft and having the axes thereof extending in parallel with the crankshaft, said balancer shafts being rotatably supported by at least two balancer shaft bearings and being disposed according to an axial direction of the balancer shaft,
a first balancer weight disposed on the balancer shaft between the balancer shaft bearings,
a second balancer weight cantilevered at a position opposing the first balancer weight, the other balancer shaft bearing being positioned between the balancer weights, and
the balancing device permitting the inertia forces generated by the first and the second balancer weights to be applied to the center of gravity of a piston-connecting rod system for compensating a secondary inertia force generated by the engine, comprising the improvement wherein the balancer shaft bearing between the first and the second balancer weights is displaced toward the second balancer weight according to the axial direction of the balancer shaft for a certain distance from an intersection Y of an axis of the balancer shaft with a plane passing through the center of gravity Gp of the piston-connecting rod system so that a distance L2 between the intersection Y and the center of gravity G2 of the second balancer weight is longer than a distance L1 between the intersection Y and the center of gravity G1 of the first balancer weight and so that the moment created at the intersection Y by the inertia force F1 of the first balancer weight and the moment created at the intersection Y by the inertia force F2 of the second balancer weight are balanced.

2. The balancing device according to claim 1, wherein the second balancer weight is formed so that its diameter is centered with respect of the axis of the balancer shaft and which is gradually reduced toward the ends of the balancer shaft.

3. The balancing device according to claim 2, wherein the second balancer weight is positioned within an oil pan that is attached to a lower part of the crank case, the oil pan has the lower surface formed with an inclined surface along a surface of the second balancer weight, and an exhaust pipe is arranged below the inclined surface.

4. The balancing device according to claim 1, wherein the balancer shaft is contained in a balancer case, the balancer case is provided with a mounting bracket for connecting a balancer shaft bearing holding section, which is between the first and the second balancer weights, and a crankshaft bearing holding section adjacent the center of gravity of the piston-connecting rod system, end surfaces of the first balancer weight facing the second balancer weight are formed to have an inclined surface which is inclined toward the outer diameter away from the end of the second balancer weight, and the mounting bracket is inclined along the inclined surface so as to have a shape such that the mounting bracket connects in line the balancer shaft bearing holding section with the crankshaft bearing holding section.

* * * * *